April 20, 1926.

D. JAMES ET AL 1,581,213

BAKE PAN SUPPORTING DEVICE

Filed Oct. 1, 1925

Inventors
D. James,
F. James,

By

Attorney

April 20, 1926. 1,581,213

D. JAMES ET AL

BAKE PAN SUPPORTING DEVICE

Filed Oct. 1, 1925  2 Sheets-Sheet 2

Inventors
D. James,
F. James,
By
Attorney

Patented Apr. 20, 1926.

1,581,213

UNITED STATES PATENT OFFICE.

DAVID JAMES AND FREDERICK JAMES, OF PASADENA, CALIFORNIA.

BAKE-PAN-SUPPORTING DEVICE.

Application filed October 1, 1925. Serial No. 59,848.

*To all whom it may concern:*

Be it known that we, DAVID JAMES and FREDERICK JAMES, both citizens of the United States, residing at Pasadena, in the county of Los Angeles and State of California, have invented certain new and useful Improvements in a Bake-Pan-Supporting Device, of which the following is a specification.

This invention relates to a bake pan supporting device and more particularly to an improvement over the bake pan supporting device embodied in the co-pending application bearing Serial Number 758,222 filed December 26th, 1924 by Frederick James, one of the co-inventors of the present invention.

One of the important objects of the present invention is to provide a bake pan supporting device which includes a means for operatively associating the same with the usual hinged door provided for the baking compartment of the oven, so that the device will be adapted for slidable movement simultaneous with the opening and closing of the door.

A further object of the invention is to provide a bake pan supporting device of the above mentioned character which includes a means for rotating the portion of the device on which a bake pan rests, when the door is open and the supporting device is moved outwardly from the baking compartment of the oven; additional means being provided for rotating the bake pan in the reverse direction when the door is moved to a closed position and the supporting device slides rearwardly into the baking compartment.

A still further object is to provide a bake pan supporting device of the above mentioned character which will at all times be positive and efficient in its operation as well as automatic, thereby preventing or obviating the necessity of a person having to touch the bake pan whenever it is necessary to move the same.

Other objects and advantages of this invention will become apparent during the course of the following description.

In the accompanying drawings forming a part of this specification and in which like numerals designate like parts throughout the same:—

Figures 1, 2:
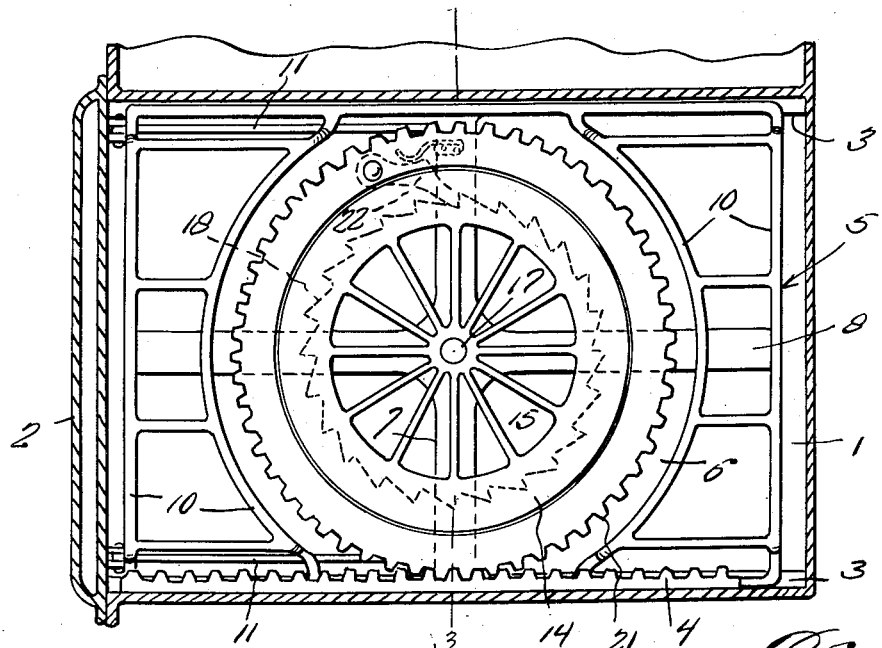
Figure 1 is a sectional view through the baking compartment and the door therefor of a baking oven showing the present invention in top plan.
Fig. 2 is a side elevation.

In the drawings wherein for the purpose of illustration is shown the preferred embodiment of our invention, the numeral 1 designates the baking compartment of a bake oven, the front of which is open and associated therewith is the usual hinged door 2, the latter being hingedly supported at its bottom in the manner well known in the art.

Provided on the inner wall of the side of the compartment 1 are the pairs of ribs or lugs 3 which are provided for supporting a shelf or rack in the baking compartment in the manner well known in the art.

Arranged on the inner wall of one of the sides of the baking compartment and disposed above one of the guide ribs or lugs 3 and disposed in parallel relation thereto, is the rack member 4, the purpose thereof being hereinafter more fully described.

Adapted for slidable movement on one pair of guide ribs within the baking compartment 1 is the rack designated generally by the numeral 5. The rack 5 is provided with a large central opening 6. A cross strip 7 extends transversely between the intermediate portions of the sides of the rack 5 and is disposed in spaced relation with respect to the bottom of the rack as is clearly illustrated in the drawings. A longitudinally extending strip 8 is arranged on the bottom of the rack and is disposed centrally thereof. The intersecting portions of the strips 7 and 8 form a vertical bearing 9, the purpose of which will be hereinafter more fully described.

Formed in the upper face of the rack 5 and extending around the edges of the central opening 6 as well as along the sides and ends of the rack are what we term as guard rails, the same being indicated by the numeral 10.

The rack 5 is adapted to be operatively associated with the hinged door 2 through the medium of the connecting link 11, there being a pair of said links, the same being connected at their upper ends to the transversely extending strip 7 as illustrated at 12 and at their opposite ends to the intermediate portion of the hinged door 2 as illustrated at 13. This construction permits the rack 5 to slide forwardly and rearwardly with respect to the baking compartment simultaneous with the opening and closing of the door as will hereinafter be more fully elucidated.

The bake pan supporting member forming a part of the present invention is in the form of a wheel, the same being designated generally by the numeral 14. The wheel is preferably formed by taking the disc of suitable thickness and forming radially extending openings 15 therein so as to provide a central hub portion 16. A bolt 17 extends through the hub 16 of the wheel 14 and through the bearing 9 on which the bake pan supporting member rests, the wheel 14 being of a relatively smaller diameter than the diameter of the enlarged central opening 6 formed in the rack 5.

Figure 3:
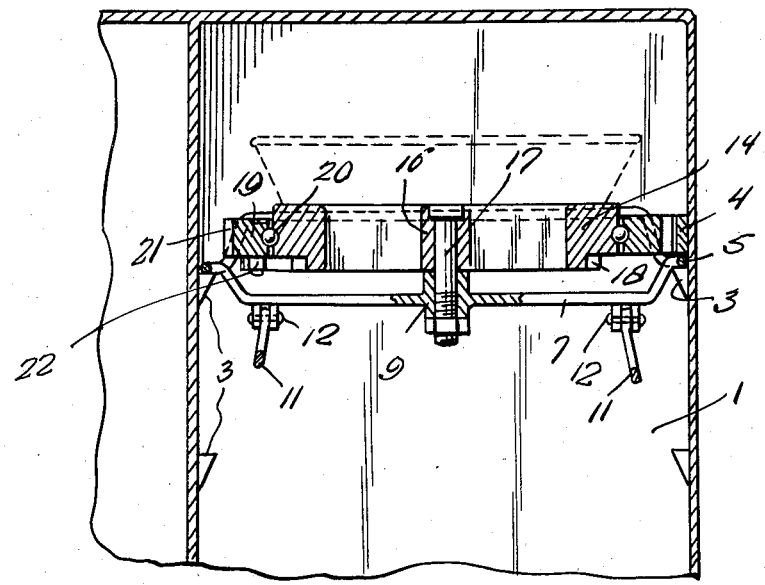
Fig. 3 is a sectional view taken approximately on line 3—3 of Fig. 1.
Figure 4:
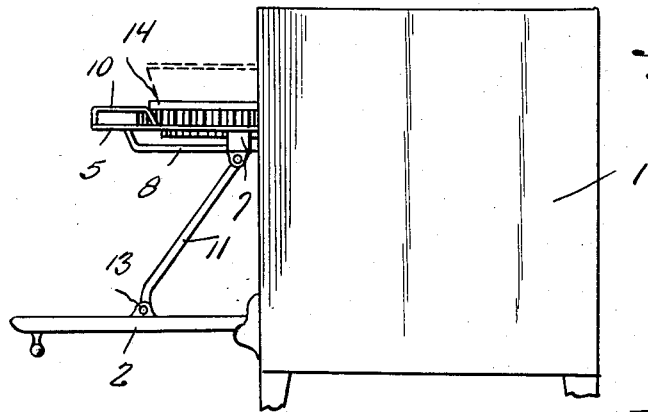
Fig. 4 is a side elevation showing the arrangement of the parts when the hinged door of the baking compartment is disposed in an open position.

The wheel 14 is provided with the ratchet teeth 18 in the periphery of the lower portion thereof as is clearly illustrated in Fig. 3.

Cooperating with the bake pan supporting member 14 is the ring gear 19. A ball bearing raceway 20 is provided between the peripheral face of the bake pan supporting member 14 and the inner peripheral face of the ring gear 19 so that the latter is free to revolve around the wheel 14 in the manner to be presently apparent.

The upper face of the ring gear 19 is disposed below the upper face of the bake pan supporting member 14 as is clearly illustrated in Fig. 3, and the purpose thereof is to provide a means for supporting the bake pan out of contact with the ring gear when in position or resting on the wheel 14.

The teeth 21 of the ring gear 19 provided in the outer peripheral edge thereof are adapted to engage the rack 4 in the manner as clearly illustrated in the drawings. A spring pressed pawl 22 is pivotally supported on the bottom face of the ring 19 and is adapted for engagement with the ratchet 18 as also clearly illustrated in the drawing.

The operation of our improved device may be briefly stated as follows:—

A bake pan containing the food to be baked is placed on the supporting member or wheel 14 and the rack 5 carrying the bake pan supporting member will move rearwardly into the baking compartment 1 when the hinged door 2 is closed. Whenever it is necessary to watch the progress of the baking, the door 2 is swung downwardly to an open position simultaneously causing the rack 5 to move forwardly. The forward movement of the rack 5 will cause the ring gear 19 to rotate in one direction due to the teeth 21 of the ring gear being in engagement with the stationary rack 4. The rotation of the ring gear 19 during the forward sliding movement of the rack 5 will not cause the rotation of the bake pan supporting member 14.

When the door 2 is swung upwardly to a closed position, the rack 5 will move longitudinally and rearwardly into the baking compartment 1 along the guides provided therefor. During the rearward sliding movement of the rack, the ring gear 19 will be caused to rotate in the reverse direction and simultaneously cause the bake pan supporting member 14 to also be rotated through the medium of the pawl and ratchet mechanism associated with the ring gear and bake pan supporting member. The rotation of the bake pan supporting wheel 14 will enable the bake pan and the contents thereof to be rotated so that the food will not burn, and will furthermore be permitted to thoroughly bake.

It will thus be seen from the foregoing description, that a bake pan supporting device has been provided which is automatically operated by the opening and closing of the door of the baking compartment, the necessity of a person touching the bake pan to move the same to various positions being obviated and thus preventing any danger of a person burning his fingers or hands. The simplicity in which the present device is constructed enables the same to be readily and easily installed in any of the well known makes of baking ovens, the device being simple in construction, inexpensive, strong and durable.

While we have shown the preferred embodiment of our invention, it is to be understood that various changes in the size, shape and arrangement of parts may be resorted to without departing from the spirit of the invention and the scope of the appended claims.

Having thus described our invention, what we claim as new is:—

1. In combination with a bake oven including the usual baking compartment thereof, and the hinged door associated therewith, of a rack adapted for slidable movement in said baking compartment, means for connecting said rack to the hinged door whereby the rack will slide forwardly and rearwardly simultaneous with the opening and closing of the door, a bake pan supporting member mounted on said rack, means for rotating the same during the sliding movement of the rack in one direction, said last mentioned means comprising a stationary rack arranged on the inner wall of one of the sides of the baking compartment, a ring gear revolvably associated with the bake pan supporting member, the teeth of the ring gear engaging said stationary rack, and a pawl and ratchet mechanism associated with the ring gear and bake pan supporting member.

2. In combination with a bake oven including the usual baking compartment and the hinged door associated therewith, of a rack adapted for slidable movement in said compartment, a connection between said rack and said door whereby the rack will slide forwardly and rearwardly with respect to the compartment, simultaneous with the opening and closing of the door, a bake pan supporting member rotatably mounted on the rack, and a pawl and ratchet mechanism for rotating said bake pan supporting member during the sliding movement of the rack in one direction.

3. In combination with a bake oven including the usual baking compartment and the hinged door associated therewith, of a bake pan supporting device arranged in said baking compartment, and means for automatically rotating the device in one direction simultaneously with the closing of the door.

In testimony whereof we affix our signatures.

FREDERICK JAMES.
DAVID JAMES.